Dec. 20, 1932.  W. HABEL  1,891,641
ARTIFICIAL HORIZON FOR SEXTANTS
Filed Aug. 12, 1931  2 Sheets-Sheet 1

Inventor
Wenzel Habel
By Frank Keifer
Attorney

Dec. 20, 1932.  W. HABEL  1,891,641
ARTIFICIAL HORIZON FOR SEXTANTS
Filed Aug. 12, 1931  2 Sheets-Sheet 2
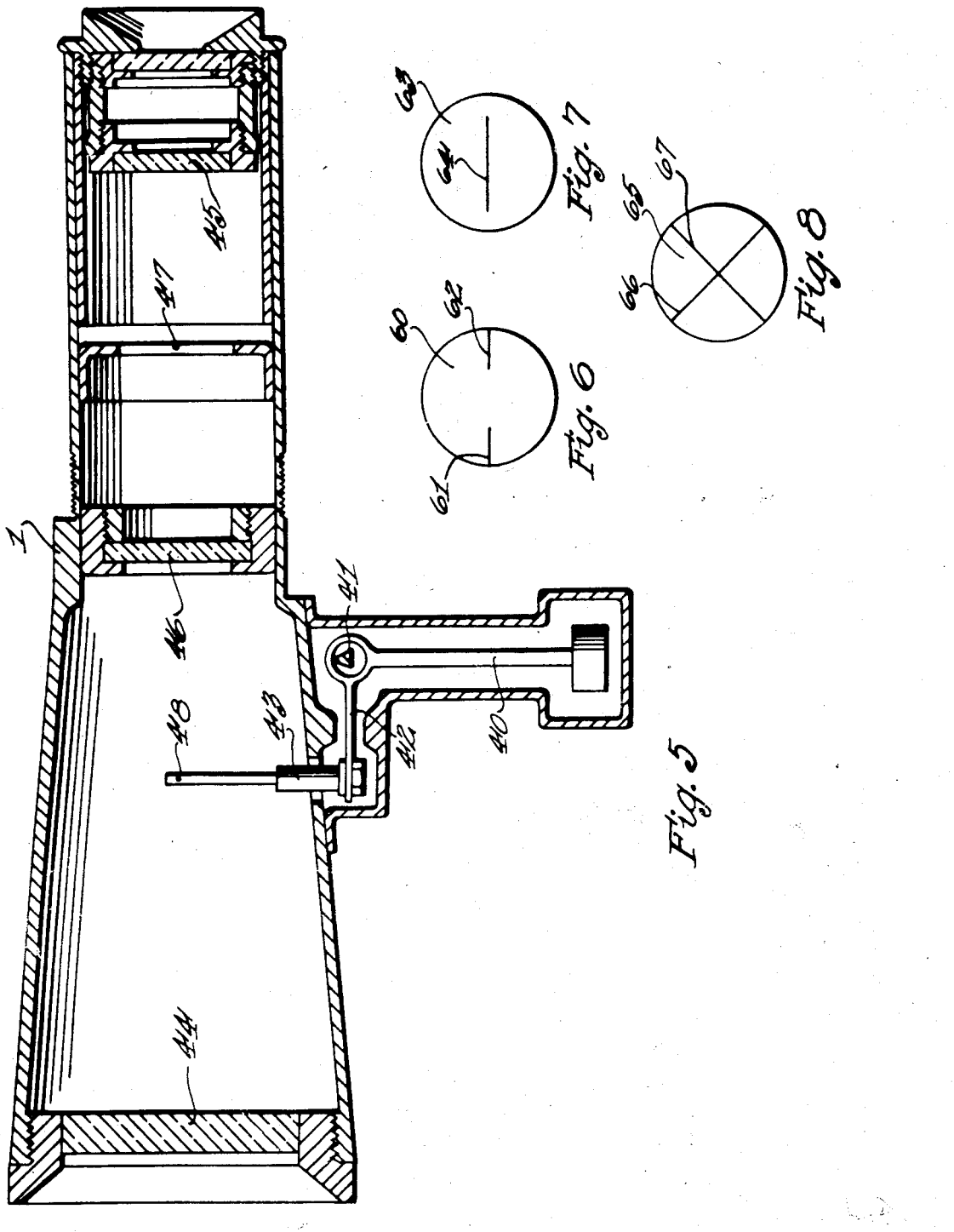
Inventor
Wenzel Habel
By Frank Keifer
Attorney Patented Dec. 20, 1932

1,891,641

UNITED STATES PATENT OFFICE

WENZEL HABEL, OF ROCHESTER, NEW YORK

ARTIFICIAL HORIZON FOR SEXTANTS

Application filed August 12, 1931. Serial No. 556,491.

The object of this invention is to provide a new and improved form of artificial horizon for use in connection with the telescopes of sextants, used for the purpose of obtaining latitude and longitude and for other purposes such as measuring heights or distances.

Another object of the invention is to embody the device, by which the artificial horizon is secured, in either the ordinary telescope used in a sextant, or in a second tube that will be placed parallel therewith, the tube and telescope being used together in such case like a binocular.

These and other objects of the invention will be illustrated in the drawings, described in the specification and pointed out in the claims at the end thereof.

In the drawings:

Figure 5 is a vertical section through a telescope in which the pendulum and hair lines, together with the erector lens, constituting my invention, are all embodied in the telescope, the parallel tube being dispensed with.

Figures 6, 7 and 8 show diagrammatic views of glass discs having hair lines marked thereon, such as can be used in this instrument.

In the drawings like reference numerals indicate like parts.

Figure 1:
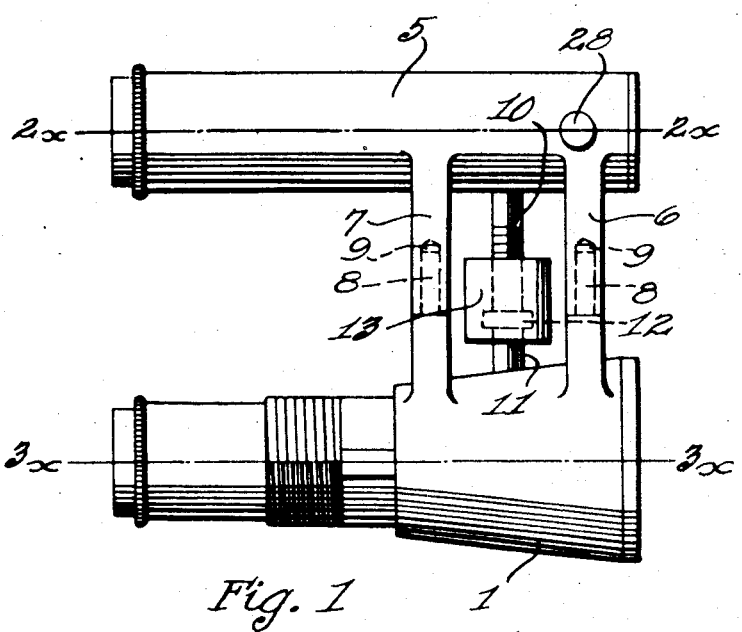
Figure 1 is a top plan view of the telescope and the tube combined.
Figure 2:
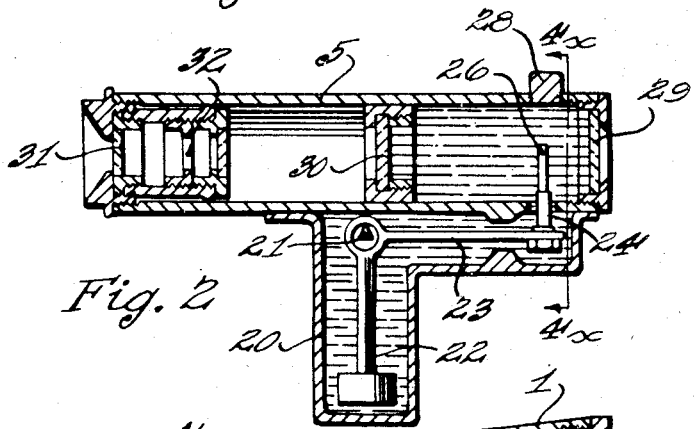
Figure 2 is a vertical section through the tube on the line 2x 2x of Figure 1.
Figure 3:
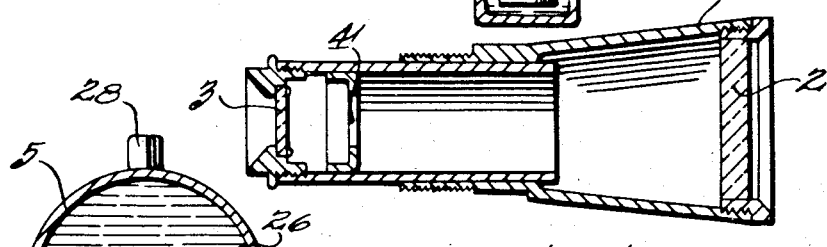
Figure 3 is a vertical section through the telescope on the line 3x 3x of Figure 1.
Figure 4:
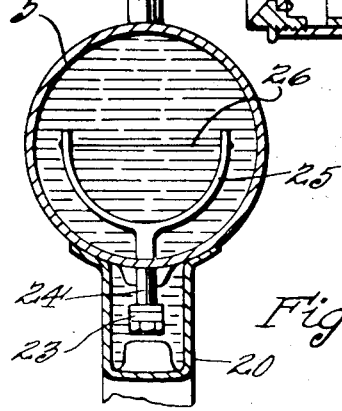
Figure 4 is a vertical section on the line 4x 4x of Figure 2 looking in the direction of the arrow.

In the drawings reference numeral 1 indicates the short telescope ordinarily used in a sextant having an object lens 2 at one end thereof and an eyepiece 3 at the other end. At a suitable point in this telescope and across the optical axis thereof is placed a hair line 4.

Adjacent to this telescope is provided a tube 5. The tube and the telescope are so connected together that the axis of both will be parallel. The tube and the telescope are connected by cross braces 6 and 7. The cross braces are provided with sliding engagement indicated by pins 8, 8 sliding in suitable sockets 9, 9 and the adjustment is secured by a threaded stem 10 on the tube and a plain stem 11 on the telescope. The plain stem 11 has a head 12 thereon with which a nut 13 makes a swiveled engagement, the nut making a threaded engagement with the stem 10. By turning this nut, the telescope and the tube are adjusted apart or together, as may be desired, for different spacings between the eyes of different observers.

The tube 5 is provided with a chamber 20 below it, in which is mounted a knife edge 21, on which is adapted to swing a pendulum 22. This pendulum is provided with a bracket 23 extending laterally therefrom and preferably forward. Near the end of this bracket is provided a standard 24, which extends into the tube, through an opening provided therefor, on the top of which is provided a fork 25. Between the opposite ends of this fork is mounted a hair line 26. This hair line can rise and fall with the swinging of the pendulum and is therefore called a wandering hair line. The chamber 20 in which the pendulum swings is preferably filled with some light liquid, which will damp the swinging of the pendulum, that is, prevent oscillation and vibration in the wandering hair line.

On top of the tube 5 is a threaded opening which is closed by a plug 28, through which liquid can be filled into the chamber. The forward end of the tube 5 is closed with a glass disc 29, which is adapted to admit the light, and the intermediate part of the tube is also closed with an erector lens 30. The chamber enclosed between the erector lens 30 and the glass disc 29 may also be filled with the fluid that is placed in the chamber 20, although it will be understood that this fluid may be omitted from the whole instrument if desired.

It will also be understood that the so-called hair line is well known in the art of optical instruments.

At the forward end of the tube 5 is provided the eyepiece 31, and between the eyepiece 31 and the erector lens 30 is provided a stationary hair line 32 in the optical axis of the instrument.

When the operator looks through the tube 5, he will see the image of the wandering hair line 26 in line with the stationary hair line 32, providing the tube is held level. This result of superimposing the image of the wandering hair line 26 on the stationary hair line 32 is secured by the erector lens 30 and makes a third hair line in the tube 5 unnecessary. When the tube 5 is held level, the wandering hair line 26 will intersect the optical axis of the lenses 30 and 31 and this optical axis will then intersect both the hair lines at the same time.

At the same time that the operator is looking through the tube 5 with one eye he is looking through the telescope 1 with his other eye, and he will see the stationary corrector hair line 4 superimposed on the stationary hair line 32, and when these stationary hair lines are in line with the wandering hair line 26, he will know that his telescope is held in a horizontal position and this in turn gives him an artificial horizon, with which he can use the sextant in measuring the altitude of celestial bodies either at night or in the day time when the ordinary horizon is not visible or is obscure. In order to make the instrument serviceable at night, the hair lines will be coated with a luminous composition that will make them visible in the dark.

In Figure 5 I have shown a modification of the instrument in which the pendulum is embodied in the telescope 1 itself, and the tube 5 is omitted. In such case the pendulum 40 is mounted to swing on the knife edge 41 and is provided with a bracket 42 on which is provided a standard 43 which is suitably forked and is provided with a wandering hair line. The telescope is provided with an object glass 44, an eyepiece 45, an erector lens 46, and a stationary hair line 47. The lenses 44, 45 and 46 are mounted so that their optical axes are in line with each other, or are all in the same line, or coincide with each other. The stationary hair line 47 is mounted to intersect this axis. The wandering hair line 48 is so adjusted that when the instrument is level, it will also intersect the optical axis of the instrument, and the image of the hair line will then be imposed on the hair line 47, as will be seen by the observer when he looks through the telescope. This will also give to the observer an artificial horizon.

It will be understood that either one or the other of the instruments described above will be used on the sextant to take the place of the short telescope heretofore used, and will give to the instrument an artificial horizon which the observer can always use when he cannot see the natural horizon or can be used instead of the natural horizon.

It will also be understood that the telescope used in either form of my invention will be a short, compact telescope having a magnification preferably of four or five diameters and a large object glass and a correspondingly large field.

It will also be understood that this artificial horizon can also be used on transits and other surveying instruments.

In Figures 6, 7 and 8 I have shown glass discs having hair lines thereon. In Figure 6 the disc 60 has two short hair lines 61 and 62 thereon, which are in line with each other and with the center of the disc, the lines being spaced apart at the center. In Figure 7 the disc 63 has one short line 64 placed centrally thereon. In Figure 8 the disc 65 has two lines 66 and 67, which cross each other at the center. These discs can be used in this instrument. The disc shown in Figure 6 can be mounted in the yoke and will move with the pendulum. The disc shown in Figure 7 can be mounted stationary as indicated at 47, with its line intersecting the optical axis, or these two discs may be reversed in position. Both lines should normally stand horizontal and parallel to each other. When the instrument is level, the wandering lines or line on the moving disc as seen through the erector lens will merge with the line or lines on the stationary disc, and an artificial horizon will thus be established.

I claim:

1. An artificial horizon for a sextant comprising a tube, a fixed hair line therein, a pendulum and a support therefor, a bracket on said pendulum extending laterally therefrom, a standard extending up from said bracket, a wandering hair line supported on said standard and adapted to rise and fall with the swing of the pendulum, an erector lens between the two hair lines adapted to focus the image of one hair line on the other when the wandering hair line intersects the optical axis of the lens, said wandering hair line and pendulum being adjusted so that the intersection occurs when the optical axis is horizontal.

2. An artificial horizon for a sextant comprising a pendulum and a support therefor, a bracket on said pendulum extending laterally from the top thereof, a wandering hair line supported above said bracket and moving therewith, an erector lens placed on one side of said hair line, and a glass disc placed on the other side of said hair line, a casing surrounding said lens and disc and enclosing the pendulum and bracket and hair line, said casing being adapted to hold a liquid that will damp the oscillations of the pendulum and hair line.

3. An artificial horizon for a sextant comprising a pendulum and a support therefor, a bracket on said pendulum extending laterally therefrom, a wandering hair line supported above said bracket and moving therewith, a stationary hair line, an erector lens placed between the two hair lines adapted to focus the image of one hair line on the other when the wandering hair line intersects the optical axis of the lens, said wandering hair line and pendulum being adjusted so that the intersection occurs when the optical axis is horizontal.

4. An artificial horizon for a sextant comprising a tube, a fixed hair line therein, a pendulum and a support therefor, a bracket on said pendulum extending laterally therefrom, a standard extending up from said bracket, a wandering hair line supported on said standard and adapted to rise and fall with the swing of the pendulum, an erector lens between the two hair lines adapted to focus the image of one hair line on the other when the wandering hair line intersects the optical axis of the lens, said wandering hair line and pendulum being adjusted so that the intersection occurs when the optical axis is horizontal, a second tube having its axis parallel to the first named tube and placed adjacent thereto, an eyepiece and an object lens at the opposite ends of said tube, a fixed hair line between them intersecting the optical axis of the lenses, said tubes forming a binocular in which the image of the hair line of the one tube will appear to be superimposed or in line with the hair lines of the other tube when the optical axes of both tubes are horizontal.

5. An artificial horizon for a sextant comprising two tubes, a fixed hair line in each tube, a pendulum and a support therefor, a bracket on said pendulum extending laterally therefrom, a standard extending up from said bracket, a wandering hair line supported on said standard and adapted to rise and fall with the swing of the pendulum, an erector lens between the two hair lines in one tube adapted to focus the image of one hair line on the other when the wandering hair line intersects the optical axis of the lens, said wandering hair line and pendulum being adjusted so that the intersection occurs when the optical axis is horizontal.

6. An artificial horizon for a sextant comprising an erector lens, a fixed hair line on one side thereof intersecting the optical axis of the lens, a wandering hair line on the other side of the lens, means for bringing the wandering hair line into position to intersect the optical axis of the lens when the optical axis is in horizontal position said means including a pendulum having a bracket extending laterally from the top thereof.

7. An artificial horizon for a sextant comprising an erector lens, a fixed hair line on one side thereof intersecting the optical axis of the lens, a wandering hair line on the other side of the lens, means for bringing the wandering hair line into position to intersect the optical axis of the lens when the optical axis is in horizontal position, a casing enclosing the wandering hair line, said casing being filled with a liquid surrounding said hair line to damp the oscillations thereof said means including a pendulum having a bracket extending laterally from the top thereof.

In testimony whereof I affix my signature.
WENZEL HABEL.